(12) United States Patent
Kim et al.

(10) Patent No.: US 9,863,524 B2
(45) Date of Patent: Jan. 9, 2018

(54) OIL COOLER FOR VEHICLE

(71) Applicants: Hyundai Motor Company, Seoul (KR); Inzicontrols Co., Ltd., Siheung-si (KR)

(72) Inventors: Jae Yeon Kim, Hwaseong-si (KR); Sang Won Lee, Incheon (KR); Sangyong Rhee, Samcheok-si (KR)

(73) Assignees: Hyundai Motor Company, Seoul (KR); Inzicontrols Co., Ltd., Siheung-si (KR)

( * ) Notice: Subject to any disclaimer, the term of this patent is extended or adjusted under 35 U.S.C. 154(b) by 269 days.

(21) Appl. No.: 14/943,978

(22) Filed: Nov. 17, 2015

(65) Prior Publication Data
US 2016/0146330 A1 May 26, 2016

(30) Foreign Application Priority Data
Nov. 21, 2014 (KR) .................. 10-2014-0163764

(51) Int. Cl.
G05D 23/00 (2006.01)
F16H 57/04 (2010.01)

(52) U.S. Cl.
CPC ..... F16H 57/0417 (2013.01); F16H 57/0416 (2013.01)

(58) Field of Classification Search
CPC ........ F28F 9/0256; F28F 27/02; F01M 5/002; F01M 5/007; F16N 21/00; F16H 57/0417; F16H 57/0416

USPC .......... 165/96, 100, 101, 102, 103, 297, 298
See application file for complete search history.

(56) References Cited

U.S. PATENT DOCUMENTS

| 2,453,737 | A | * | 11/1948 | Worth | ............... F01M 5/007 165/149 |
| 6,253,837 | B1 | | 7/2001 | Seiler et al. | |
| 2004/0112073 | A1 | * | 6/2004 | Ito | ............... B60H 1/00885 62/196.4 |
| 2008/0179051 | A1 | * | 7/2008 | Willis | ............... F28F 9/02 165/173 |

(Continued)

FOREIGN PATENT DOCUMENTS

| JP | 2000-213352 A | 8/2000 |
| JP | 2006-207943 A | 8/2006 |

(Continued)

*Primary Examiner* — Ljiljana Ciric
(74) *Attorney, Agent, or Firm* — Morgan, Lewis & Bockius LLP

(57) ABSTRACT

An oil cooler for a vehicle may include a header tank partitioned by a diaphragm formed at an inside of a center in a length direction thereof, and adapted to take in a working fluid at a first side and to take out the working fluid at a second side with respect to the diaphragm, a connection tank disposed to be spaced apart from the header tank by a predetermined interval, a plurality of tubes mounted along a length direction at an interior surface of the header tank to connect with the connection tank such that the working fluid flows therethrough, and a bypass valve integrally mounted at an outside of the header tank and connected to the inside of the header tank so as to bypass or flow the working fluid flowing therein into the inflow tank by selectively opening/closing according to a temperature of the working fluid.

22 Claims, 7 Drawing Sheets

(56) References Cited

U.S. PATENT DOCUMENTS

| | | | |
|---|---|---|---|
| 2008/0223561 A1* | 9/2008 | Li | F28D 7/14 165/156 |
| 2011/0005741 A1 | 1/2011 | Sheppard | |
| 2012/0125594 A1 | 5/2012 | Elder | |

FOREIGN PATENT DOCUMENTS

| KR | 20-0121360 Y1 | 4/1998 |
|---|---|---|
| KR | 10-2012-0039008 A | 4/2012 |
| KR | 10-2013-0065174 A | 6/2013 |
| KR | 10-2013-0102790 A | 9/2013 |
| KR | 10-2014-0072735 A | 6/2014 |

* cited by examiner

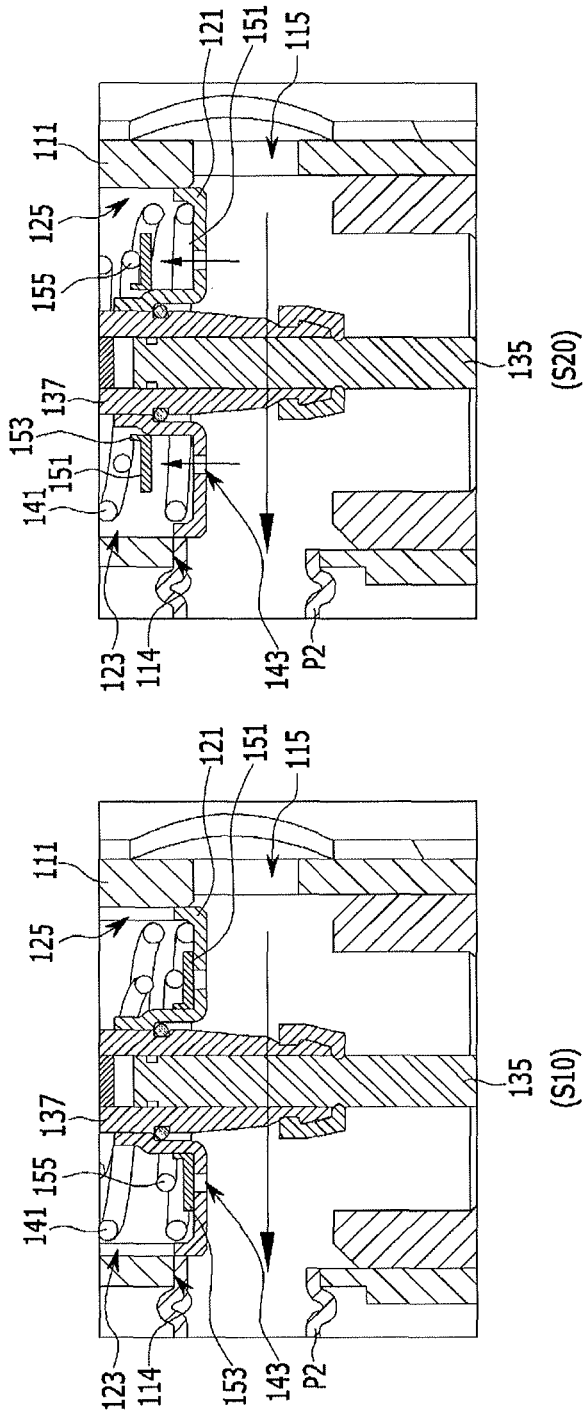

OIL COOLER FOR VEHICLE

CROSS-REFERENCE TO RELATED APPLICATION

The present application claims priority to Korean Patent Application No. 10-2014-0163764 filed Nov. 21, 2014, the entire contents of which is incorporated herein for all purposes by this reference.

BACKGROUND OF THE INVENTION

Field of the Invention

The present invention relates to an oil cooler for a vehicle. More particularly, the present invention relates to an oil cooler for a vehicle of which a bypass valve, which is operated according to a temperature of a working fluid, is integrally provided.

Description of Related Art

Generally, an oil cooler for cooling transmission oil is a device which is provided to maintain the temperature of the transmission oil at a predetermined temperature such that it is not excessively increased by slip of transmission friction components, and such that fuel consumption is not deteriorated as friction loss is increased when oil viscosity increases by excessive cooling of the transmission oil. In addition, a conventional oil cooler is divided into an air-cooling type and a water-cooling type.

Among them, an air-cooling type of oil cooler includes an oil cooler provided at a location such as a front of a radiator at which the outside air smoothly flows, and a bypass valve that is installed in a pipe which is connected to the transmission to be opened and closed depending on the temperature of the transmission oil.

The bypass valve maintains the transmission oil at the predetermined temperature, such that when the temperature of the transmission oil is higher than the predetermined temperature, the transmission oil is caused to pass through the oil cooler via the bypass valve, and when the temperature of the transmission oil is lower than the predetermined temperature, the transmission oil is not allowed to pass through the oil cooler thereby flowing back into the transmission.

However, since the conventional oil cooler has the bypass valve that is connected to the transmission to be opened and closed depending on the temperature of the transmission oil as described above, and is installed in a pipe that connects the transmission and the oil cooler, because a relatively large bypass valve is located in the pipe, there is also a drawback that the piping layout is complicated, such that spatial utility of an engine compartment is degraded.

Furthermore, with the bypass valve applied to the conventional oil cooler as described above, since each of the constituent elements needs to be sequentially fitted and assembled to a valve mounting hole of a valve housing, there are drawbacks in which it is difficult to precisely position each of the constituent elements, excessive assembling time is required, and the manufacturing cost increases.

In addition, the bypass valve applied to the conventional oil cooler has a drawback in which, when cooling of the transmission oil is not required, since a part of the low-temperature transmission oil cooled in the oil cooler flows into the bypass valve from the transmission and then flows back into the transmission, together with the bypassed transmission oil in a high-temperature state, rapid warming of the transmission oil is difficult.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an oil cooler for a vehicle having advantages of improving spatial utility of an engine compartment by having a bypass valve which is operated according to temperature of a working fluid.

According to various aspects of the present invention, an oil cooler for a vehicle may include a header tank partitioned by a diaphragm formed at an inside of a center in a length direction thereof, and adapted to take in a working fluid at a first side and to take out the working fluid at a second side with respect to the diaphragm, a connection tank disposed to be spaced apart from the header tank by a predetermined interval, a plurality of tubes mounted along a length direction at an interior surface of the header tank to connect with the connection tank such that the working fluid flows therethrough, and a bypass valve integrally mounted at an outside of the header tank and connected to the inside of the header tank so as to bypass or flow the working fluid flowing therein into the inflow tank by selectively opening/closing according to a temperature of the working fluid.

The header tank and the connection tank may be adapted to have the tubes therebetween, and may be fixed by a side plate which is mounted to connect insides of both ends of the header tank with insides of both ends of the connection tank in a state of being disposed apart from each other.

The working fluid may be transmission oil introduced from a transmission.

The working fluid may be configured such that when the bypass valve is opened, the working fluid flows into the first side of the header tank with respect to the diaphragm, flows into the connection tank through each tube, flows from the connection tank through each tube, and flows into the second side of the header tank with respect to the diaphragm.

The working fluid may flow in a U-turn flow direction to be discharged from the header tank via the connection tank and then flows into the header tank again, and may be cooled by passing through each of the tubes so as to be heat exchanged with outside air.

The bypass valve may include a valve housing integrally mounted at the outside of the header tank, and a controller mounted at an inside of the valve housing and adapted to flow the working fluid having flowed therein into the inflow tank or to bypass it by performing expansion or contraction according to the temperature of the inflowed working fluid.

The valve housing may include a first inflow hole formed at a first side thereof, which is an opposite side of the header tank, such that an inflow port is mounted thereto, a bypass hole formed at a second side thereof which is positioned apart from the first inflow hole such that a bypass port is mounted thereto, a second inflow hole formed to correspond with the first inflow hole at one surface which contacts the header tank and communicated with the first side of the inside of the header tank with respect to the diaphragm, and a discharge hole formed apart from the second inflow hole so as to be communicated with the second side of the inside of the header tank with respect to the diaphragm.

The controller may include a sliding member of which a first end is open and a mounting part is formed at a center of a second end, at least one first opening hole is formed on a first side corresponding to the first inflow hole and the bypass hole along the length direction, and at least one second opening hole is formed on a second side corresponding to the second inflow hole and the discharge hole along the length direction, and which is inserted to be slidable inside the valve housing, an end cap adapted to be mounted to a mounting hole which is formed at the valve housing such that the sliding member is inserted into the mounting hole, to close the mounting hole, and to form a fixing groove at the center thereof, a fixing rod adapted such that a first end thereof is fixed to the fixing groove, a deformable member inserted into the sliding member and adapted to forwardly or backwardly move on the fixing rod by extending or contracting according to a temperature of the working fluid that is changed such that the sliding member is selectively moved, and a first elastic member interposed between the valve housing and the sliding member and compressed or pulled so as to provide elastic force while the sliding member moves.

The first opening hole and the second opening hole may be separately formed at a first side and a second side in the length direction of the sliding member, respectively, and in the first and second opening holes positioned at the first side, a size of the first opening hole may be formed to be greater than a size of the second opening hole.

The sliding member may be configured such that when the deformable member is not deformed, the first opening hole may be positioned in the first inflow hole and the bypass hole, and of the second opening holes, the second opening hole positioned at the first side may be positioned below the second inflow hole, and the second opening hole positioned at the second side may be positioned in the discharge hole.

The sliding member may be configured such that when the deformable member is deformed, the fixing rod ascends and maintains the bypass hole and the discharge hole in an open state at a time of deformation of the deformable member, and the first and second opening holes positioned at the first side are positioned in the first and second inflow holes to open the first and second inflow holes.

The sliding member may be fixed to the deformable member through a fixing ring mounted between the mounting part and the deformable member below the deformable member inserted to the mounting part.

A seal ring that prevents the working fluid flowing into the valve housing from leaking to an outside of the valve housing may be mounted between the valve housing and the end cap.

The end cap may be fixed to the valve housing through a mounting ring that is fixedly mounted to an interior circumferential surface of mounting hole.

The mounting ring may be fixedly mounted through a ring groove formed along a periphery of the interior circumferential surface of the mounting hole.

The sliding member may include at least one relief hole that is formed at a position spaced apart from the mounting part at the second end in which the mounting part is formed.

A plurality of the relief holes may be formed at positions spaced apart from each other at a predetermined angle along a circumferential direction around the mounting part.

A pressure controller which is configured to selectively open and close the relief hole when a differential pressure occurs by the working fluid having flowed inside the valve housing may be provided between the sliding member and the deformable member.

The pressure controller may include an opening and closing member disposed inside the second end of the sliding member to correspond to the relief hole, and a second elastic member interposed between the opening and closing member and the deformable member inside the sliding member, and configured to apply elastic force to the opening and closing member.

The opening and closing member may be formed in a disk shape having a penetration hole formed at a center thereof to correspond to the mounting part.

The opening and closing member may be integrally formed with a protrusion that protrudes toward the second elastic member from an interior circumferential surface of the penetration hole.

The valve housing may form a mounting space where the first and second inflow holes, the bypass hole, and the discharge hole communicate therewith.

As mentioned above, in accordance with an oil cooler for a vehicle according to various embodiments of the present invention, by having a bypass valve which is operated according to temperature of working fluids, there is an effect of improving spatial utility of an engine compartment.

Furthermore, by controlling the flow stream of the working fluids to allow the working fluids to bypass or flow into the oil cooler, while rapidly expanding or contracting depending on the temperature of working fluids through a bypass valve provided integrally, the oil cooler having a simple structure, there is an effect of achieving convenient manufacturing and assembling, and reducing manufacturing cost through simplification of the constituent elements.

In addition, there are effects in which, during bypass of the working fluid, the required power of the hydraulic pump can be reduced through the increase of flow rate, and by assembling the internal constituent elements to the valve housing later, and since the internal components can be replaced after breakdown, the maintenance costs and reduced and the convenience of replacement work is improved.

Further, there are effects in which the flow rate can be increased by securing the bypass flow passage compared to the related art, by preventing the transmission oil cooled by the oil cooler from leaking to the transmission in advance.

Further, reliability of the flow stream control according to temperature of the transmission oil can be secured, and by reducing the friction loss inside the transmission through the rapid warming of the transmission oil, the overall fuel consumption efficiency of the vehicle is improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7A and FIG. 7B are diagrams of a step-by-step operation state of a pressure controller applied to the bypass valve that is used for the exemplary oil cooler for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
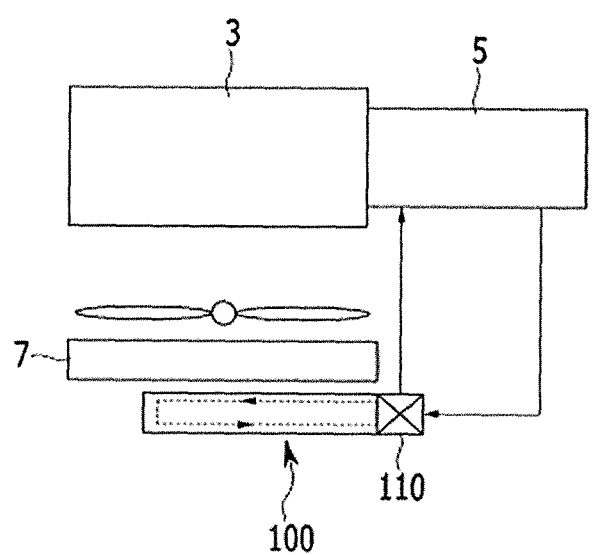
FIG. 1 is a block diagram of a transmission oil cooling system to which an exemplary oil cooler for a vehicle according to the present invention is applied.
Figure 2:
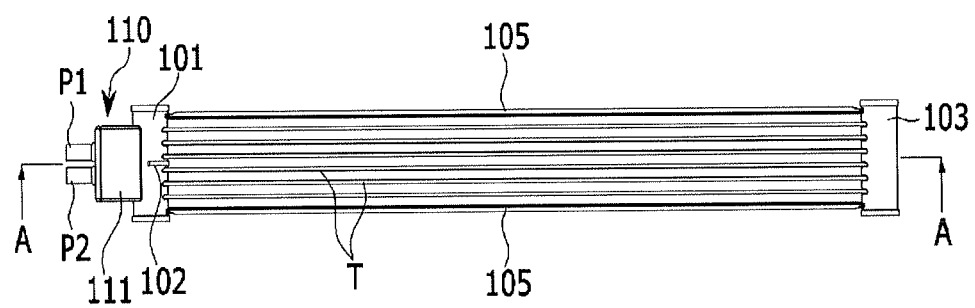
FIG. 2 is a front view of the exemplary oil cooler for a vehicle according to the present invention.
Figure 3:
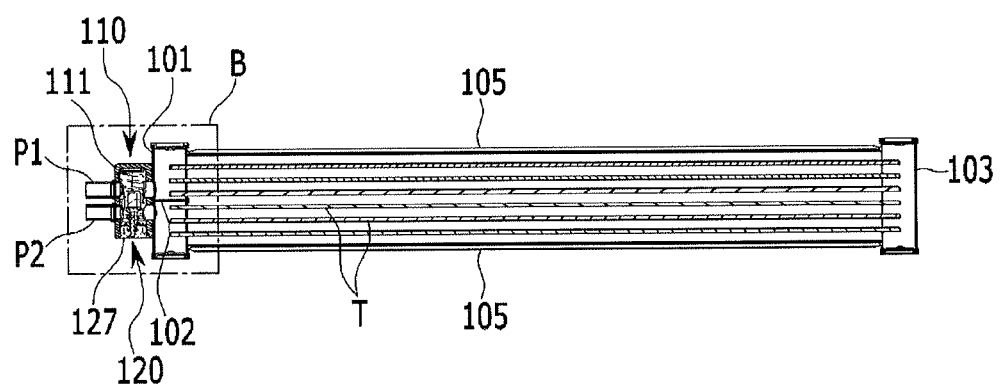
FIG. 3 is a cross-sectional view taken along line A-A of FIG. 2
Figure 4:
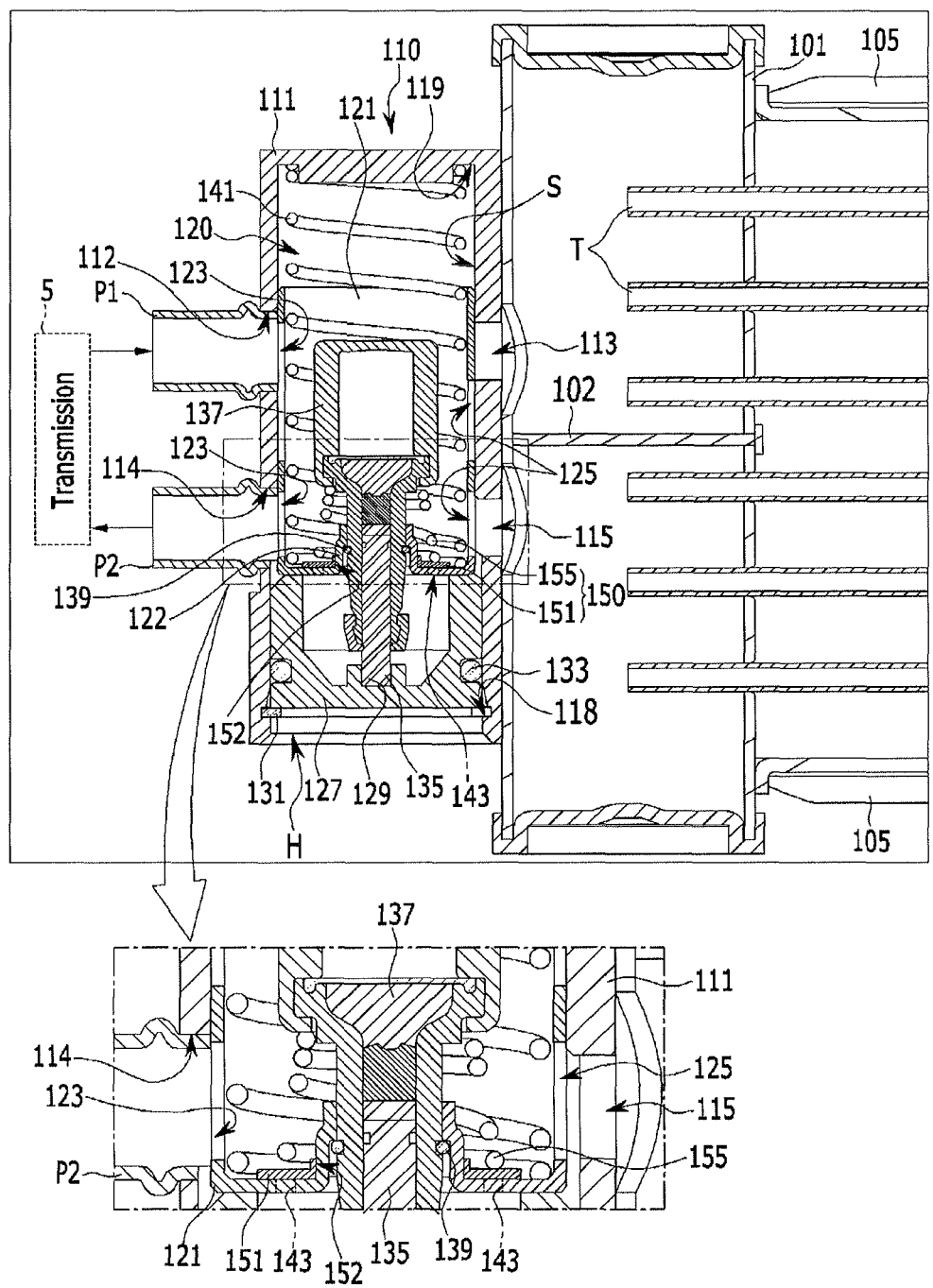
FIG. 4 is an enlarged view of part B of FIG. 3.

FIG. 1 is a block diagram of a transmission oil cooling system to which an oil cooler for a vehicle according to various embodiments of the present invention is applied, FIG. 2 is a front view of the oil cooler for a vehicle according to various embodiments of the present invention, FIG. 3 is a cross-sectional view taken along line A-A of FIG. 2, and FIG. 4 is an enlarged view of part B of FIG. 3.

The oil cooler 100 for the vehicle according to various embodiments of the present invention is configured to pass a working fluid therein or bypass the same depending on a temperature of the working fluid which flows therein. Therefore, the oil cooler cools the working fluid by exchanging heat with outdoor air introduced from the outside as an air-cooling type.

Here, the working fluid may be configured of transmission oil introduced from a transmission 5.

That is, in the various embodiments, the oil cooler 100 is, as shown in FIG. 1, integrally configured with a bypass valve 110. The oil cooler 100 is connected to the transmission 5 mounted on one side of an engine 3 through the bypass valve 110.

The oil cooler 100 is disposed in front of a radiator 7 through which heat exchanges with the flowing outside air while traveling. The bypass valve 110 rapidly bypasses or flows into the oil cooler 100 depending on the temperature of the transmission oil introduced from the transmission 5.

As shown in FIG. 2 and FIG. 3, the oil cooler 100 includes a header tank 101, a connection tank 103, tubes (T), and the bypass valve 110.

The inside of header tank 101 is partitioned by a diaphragm 102 which is formed at an inside of the center thereof in the length direction. The transmission oil flows into one side of the header tank 101 and is discharged to the other side of the header tank 101 with respect to the diaphragm 102.

The connection tank 103 is disposed to be spaced apart from the header tank 101 by a predetermined interval.

In the various embodiments, a plurality of the tubes T are mounted along a length direction at the interior surface of the header tank 101 so as to connect with the connection tank 103 such that the transmission oil flows therethrough.

The header tank 101 and the connection tank 103 may be adapted to have the tubes T therebetween, and are fixed by side plates 105 which are mounted so as to connect the insides of both ends of the header tank 101 with the insides of both ends of the connection tank 103 in state of being disposed apart from each other.

The bypass valve 110 is integrally mounted to an outside of the header tank 101 and is connected to an inside of the header tank 101. The bypass valve 110 is selectively opened or closed according to a temperature of the transmission oil, which flows from transmission 5, so as to bypass the transmission oil or flow the transmission oil into the header tank 101.

When the bypass valve 110 is opened, the transmission oil flows into one side of the header tank 101 with respect to the diaphragm 102 and flows into the connection tank 103 through each tube T. Thereafter, the transmission oil flows from the connection tank 103 through each tube T, and flows into the other side of the header tank 101 with respect to the diaphragm 102.

That is, the transmission oil flows as a U-turn flow type to be discharged from the header tank 101 via the connection tank 103 and then flows into the header tank 101 again, and is cooled by passing through each of the tubes T so as to be heat exchanged with the outside air.

Figure 5:
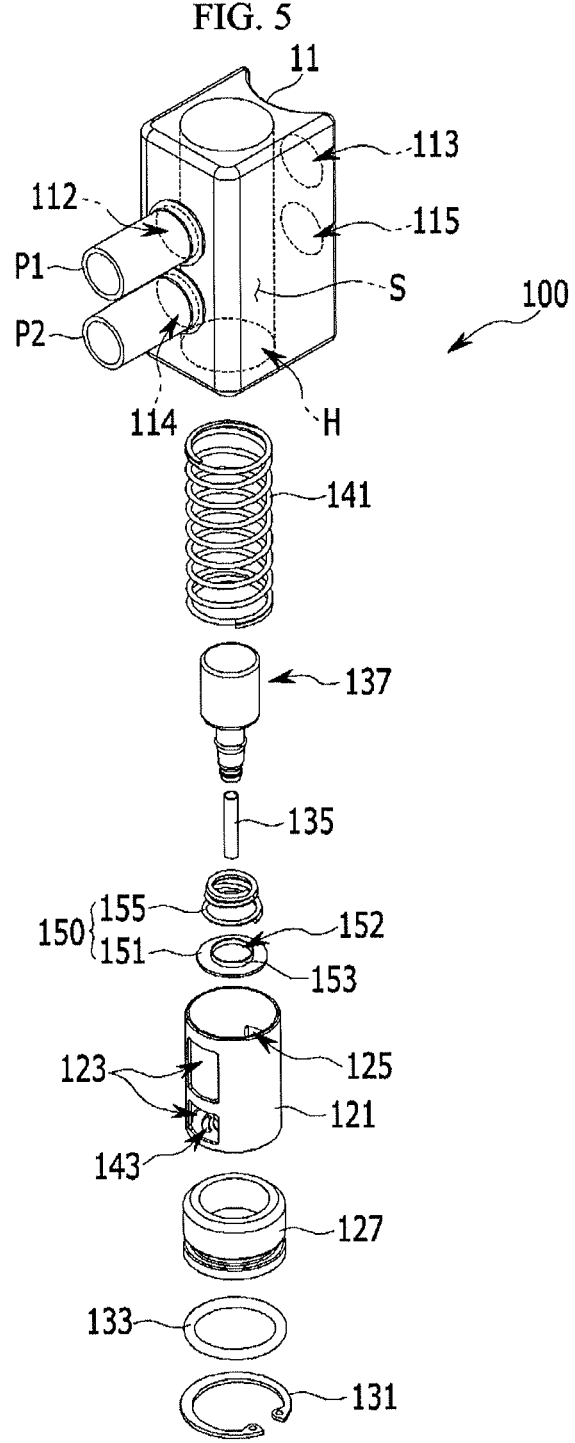
FIG. 5 is an exploded perspective view showing a bypass valve that is used for the exemplary oil cooler for a vehicle according to the present invention.

As shown in FIG. 4 and FIG. 5, the bypass valve 110 includes a valve housing 111 and a controller 120.

In the various embodiments, the valve housing 111 is integrally mounted at the outside of the header tank 101.

The valve housing 111 may have a first inflow hole 112 formed at one side thereof, which is an opposite side of the header tank 101 such that an inflow port P1 is mounted thereto, and a bypass hole 114 formed in the other side thereof which is positioned apart from the first inflow hole 112 such that a bypass port P2 is mounted thereto.

Furthermore, the valve housing 111 may have a second inflow hole 113 formed to correspond with the first inflow hole 112 at one surface which contacts the header tank 101 and communicating with the one side of the inside of the header tank 101 with respect to the diaphragm 102, and a discharge hole 115 formed apart from the second inflow hole 113 so as to communicate with the other side of the inside of the header tank 101 with respect to the diaphragm 102.

The inflow port P1 of the valve housing 111 is mounted to the first inflow hole 112 which is formed at an upper portion of the valve housing 111 in the drawing. The bypass port P2 is mounted to the bypass hole 114 which is formed at a lower portion of the first inflow hole 112 so as to be connected to the transmission 5.

A mounting space S may be formed at the valve housing 111. The mounting space S communicates with the first and second inflow holes 112 and 113, the bypass hole 114, and the discharge hole 115 such that transmission oil flows into or is exhausted from the transmission 5 or the header tank 101.

In the various embodiments, the first inflow hole 112 may be positioned on the same line as the second inflow hole 113 at respective sides of the upper portion of the valve housing 111, and the bypass hole 114 may be positioned on the same line as the discharge hole 115 at respective sides of the lower portion of the valve housing 111.

The controller 120 is mounted at the mounting space S of the valve housing 111 and is adapted to flow the transmission oil having flowed therein into the header tank 101 or bypass it by performing expansion or contraction according to the temperature of the inflowed transmission oil introduced from the transmission 5.

The controller 120 controls the flow stream of the transmission oil by selectively communicating the first inflow hole 112, which is formed to the inflow port P1, with the second inflow hole 113 or the bypass hole 114 by selectively closing the discharge hole 115.

The controller 120 includes a sliding member 121, an end cap 127, a fixing rod 135, a deformable member 137, and a first elastic member 141.

One end of the sliding member 121 is open, and a mounting part 122 protruding toward the inside upper part to form a hole is formed at the other end center.

At least one first opening hole 123 is formed on one side of the sliding member 121 corresponding to the first inflow hole 112 and the bypass hole 114 along the length direction.

Furthermore, the sliding member 121 is formed with at least one second opening hole 125 on the other side corresponding to the second inflow hole 113 and the discharge hole 115 along the length direction.

The sliding member 121 is inserted into the valve housing 111 so as to be mounted into the mounting space (S) in a slidable manner.

Such a sliding member 121 can be formed in a cylindrical shape in which one end facing upward is open and the other end except the mounting part 122 is closed in the drawing.

Here, the first opening hole 123 and the second opening hole 125 are formed at the top and bottom in the length direction of the sliding member 121 to be spaced apart from each other, and in the first and second opening holes 123 and 125 positioned at the top, the size of the first opening hole 123 can be formed to be greater than the size of the second opening hole 125.

In the various embodiments, the end cap 127 is mounted to a mounting hole H which is formed in the valve housing 111, and a fixing groove 129 is formed at the center thereof.

The end cap 127 is mounted to seal the mounting space S of the valve house 111 except the first and second inflow holes 112 and 113, the bypass hole 114, and the discharge hole 115 at the mounting hole H for preventing the transmission oil from leaking from the mounting hole H.

The end cap 127 can be fixed to the valve housing 110 through a mounting ring 131 fixedly mounted to the interior circumferential surface of the open other end of the valve housing 111.

Moreover, the mounting ring 131 can be fixedly mounted through a ring groove 118 formed along the periphery of the interior circumferential surface of the open other end of the valve housing 111.

That is, the other end of the end cap 127 is supported through the mounting ring 131 mounted in the ring groove 118 in a state in which the one end of the end cap 127 is inserted into the mounting hole H of the valve housing 110, and thus the end cap 127 is fixedly mounted to the valve housing 111.

Meanwhile, a seal ring 133 configured to prevent the transmission oil flowing into the valve housing 110 from leaking to the outside of the valve housing 110 can be mounted between the inflow of the valve housing 110 and the end cap 127.

That is, the seal ring 133 seals between the exterior circumferential surface of the end cap 127 and the mounting hole H to prevent the transmission oil from leaking to the outside.

In the various embodiments, the fixing rod 135 is formed in a circular rod shape, and the other end thereof is fixed to the fixing groove 129 of the end cap 127.

The deformable member 137 is inserted to the mounting part 122 of the sliding member 121, and the bottom of the deformable member 137 is inserted to one end of the fixing rod 135.

Expansion or contraction is performed thereinside through such a deformable member 137 depending on the temperature change of the transmission oil, and the position thereof is varied through occurrence of linear displacement with the ascent or descent of the fixing rod 135 to selectively move the sliding member 121 forward or backward.

The sliding member 121 can be fixed to the deformable member 137 through a fixing ring 139 that is mounted between the mounting part 122 and the deformable member 137 below the deformable member 137 inserted to the mounting part 122.

In the various embodiments, the deformable member 137 can include a wax material of which contraction and expansion are performed thereinside depending on the temperature of a working fluid such as transmission oil.

The wax material is a material of which volume expands or contracts depending on the temperature, that is, its volume expands when temperature increases, and its volume contracts when the temperature decreases and it returns to its initial volume.

The deformable member 137 is formed by an assembly including the wax material thereinside, and when the volume deformation of the wax material occurs thereinside depending on the temperature, the deformable member 137 can move forward or backward on the fixing rod 135, while an external shape thereof is not deformed.

Accordingly, when the transmission oil exceeding the predetermined temperature flows to the deformable member 137 through the inflow port P1, as the volume thereof expands, the deformable member 137 moves the sliding member 121 forward, while rising on the fixing rod 135 from the initial position mounted on the fixing rod 135.

Conversely, as described above, when the transmission oil below the predetermined temperature flows in a state of expansion of volume, since the volume contracts, the deformable member 137 moves backward on the fixing rod 135 and returns the sliding member 121 to the initial position.

Furthermore, when the transmission oil below the predetermined temperature flows to the deformable member 137 in the initial state of being mounted to the fixing rod 135, since the expansion or contraction does not occur, the position is not varied.

The first elastic member 141 is interposed between the sliding member 121 inside the valve housing 111, and when ascending or descending depending on the expansion or contraction of the deformable member 137, the first elastic member 141 is compressed or pulled to provide elastic force to the sliding member 121.

The first elastic member 141 may be formed by a coil spring, one end of which is supported on the inner side of the closed one end of the valve housing 111, and the other end of which is supported on the inner side of the other end of the sliding member 121.

Furthermore, the valve housing 111 is formed with a support groove 119 to which the first elastic member 141 is fixed in a supported state on the inner side of the one end, and the one end of the first elastic member 141 is stably supported through the support groove 119.

The operation of the bypass valve 110 configured as above will be described below referring to the accompanying FIG. 6A and FIG. 6B.

Figure 6A:
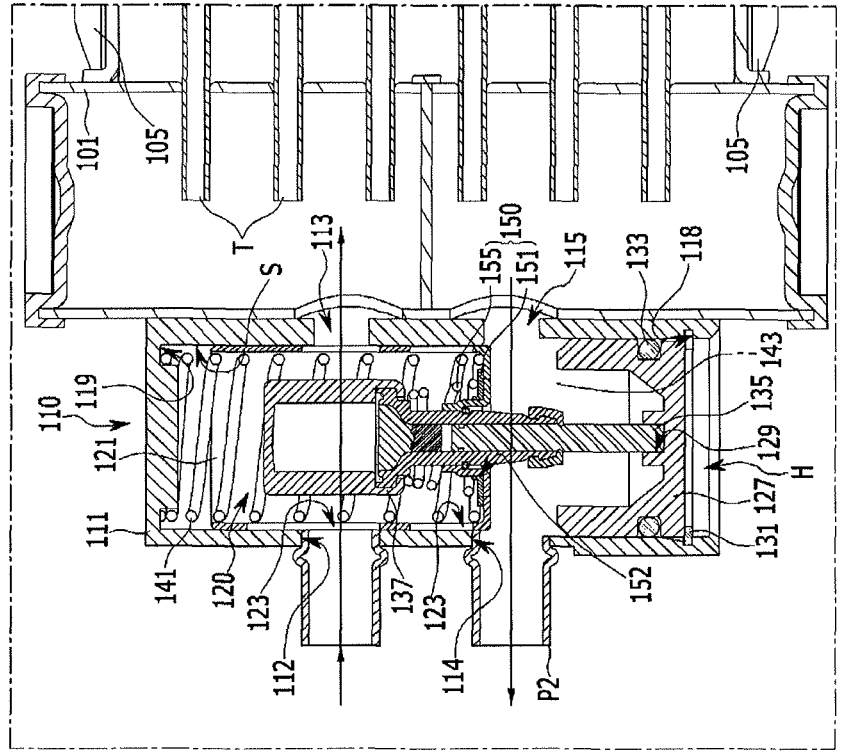
FIG. 6A and FIG. 6B are diagrams of a step-by-step operation state of the bypass valve that is used for the exemplary oil cooler for a vehicle according to the present invention.
Figure 6B:
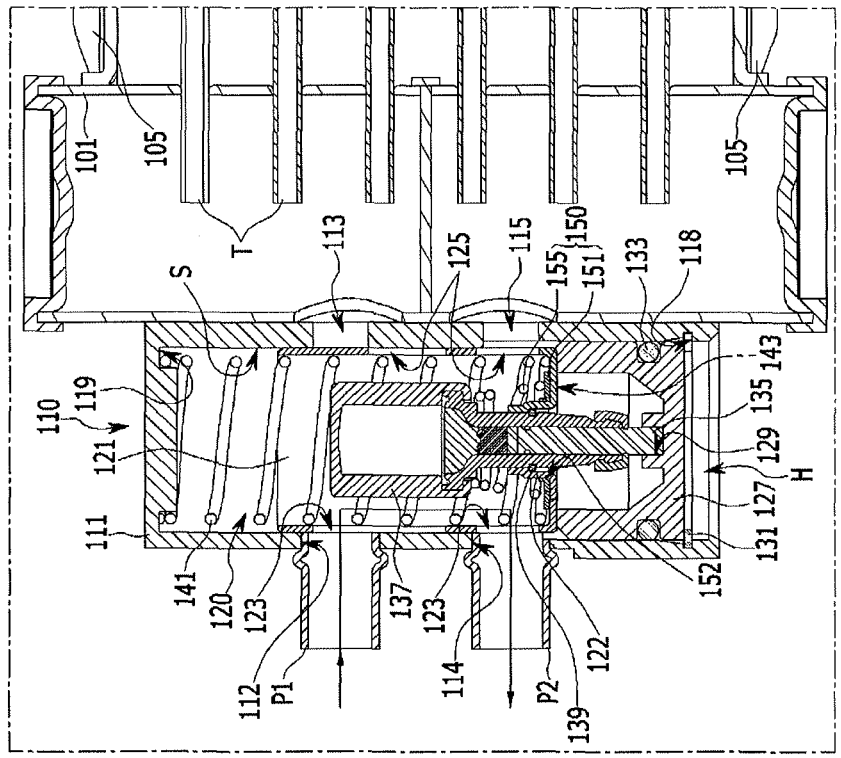

FIG. 6A and FIG. 6B are diagrams of a step-by-step operation state of the bypass valve that is used for the oil cooler for a vehicle according to various embodiments of the present invention.

As in S1 of FIG. 6A, when the transmission oil flowing in through the inflow port P1 is below the predetermined temperature, since the deformable member 137 is not deformed, the sliding member 121 maintains the initial mounting state.

In this case, the first opening hole 123 of the sliding member 121 is located in the first inflow hole 112 and the bypass hole 114, thereby opening the first inflow hole 112 and the bypass hole 114.

In the second opening holes 125, the second opening hole 125 located at the top maintains the state of closure of the second inflow hole 113 in the state of being located below the second inflow hole 113, and the second opening hole 125 located at the bottom is located at the discharge hole 115 to keep the discharge hole 115 in an open state.

Accordingly, the transmission oil flowing into the first inflow hole 112 from the transmission 5 flows into the transmission 5 again through the bypass hole 114, as the second inflow hole 113 maintains the closed state.

The bypass valve 110 is able to rapidly warm up the transmission 5 by allowing the transmission oil below the predetermined temperature having flowed from the transmission 5 to bypass to the transmission 5 again through the bypass hole 114, without cooling through the header tank 101 when the transmission oil is below the predetermined temperature.

The transmission oil is saved in the other side of the inside of the header tank 101 with respect to the diaphragm 102 in a cooled state and flows in the valve housing 111 through the opened discharge hole 115, but since the transmission oil does not flow into the header tank 101 through the closed second inflow hole 113, only a very small amount of transmission oil flows through the second inflow hole 113 and flows into the transmission 5, together with the transmission oil allowed to bypass through the bypass hole 114.

That is, the very small amount of cooled transmission oil having flowed through the discharge hole 115 does not affect the temperature of the transmission oil allowed to bypass, and as the non-cooled transmission oil continuously bypasses and flows into the transmission 5, the warming of the transmission 5 can be more rapidly performed.

Thus, with the oil cooler 100 according to various embodiments of the present invention, since the transmission 5 can be more rapidly warmed through the above-described operation of the bypass valve 110, it is possible to improve the overall fuel efficiency of the vehicle by reducing the friction loss inside the transmission 5.

In contrast, as in S2 of FIG. 6B, the sliding member 121 moves forward (ascends in the drawing) in the mounting space (S) of the valve housing 111 as the deformable member 137 expands and is deformed when a temperature of the transmission oil having flowed through the first inflow hole 112 is the same as or higher than the predetermined temperature.

The sliding member 121 is forwarded to the inside of the valve housing 111 such that the bypass hole 114 and the discharge hole 115 are maintained in the open state.

The first and second opening holes 123 and 125 located at the top are located in the first inflow hole 112 and the second inflow hole 113, thereby the first and second inflow holes 112 and 113 are maintained in the open state.

At this time, the transmission oil which flows into the first inflow hole 112 through the inflow port P1 and having a temperature that is the same as or higher than the predetermined temperature flows into the header tank 101 through the second inflow hole 113. The transmission oil having flowed into the one side of the header tank 101 with respect to the diaphragm 102 flows into the connection tank 103 through each of the tubes T so as to be firstly cooled by heat exchanging with the outside air.

The firstly cooled transmission oil flows from the connection tank 103 into the other side of the header tank 101 with respect to the diaphragm 102 through each of the tubes T so as to be secondly cooled by heat exchanging with the outside air.

The transmission oil having flowed out from the header tank 101 flows from the header tank 101 into the valve housing 111 through the discharge hole 115 and then flows from the valve housing 111 into the transmission 5 through the bypass hole 114.

Accordingly, the transmission oil cooled in the oil cooler 100 flows into the transmission 5 that is overheated due to the temperature rise of the transmission oil to cool the transmission 5.

Meanwhile, when the sliding member 121 is forwarded by the deformable member 137 moving along the fixing rod 135, the first elastic member 141 is in a state of being compressed between the valve housing 110 and the sliding member 121.

In such a state, when the temperature of the transmission oil having flowed through the first inflow hole 112 falls below the predetermined temperature, the deformable member 137 moves the fixing rod 135 backwards, while contracting and again being deformed to the initial state from the expansion state.

At this time, the sliding member 121 more rapidly descends to the initial position by elastic force of the first elastic member 141 in the compressed state, as in S1 of FIG. 6A as the initial mounting state, thereby closing the opened second inflow hole 113.

The oil cooler 100 may be controlled with the flow stream of the transmission oil through the above-described operation of the bypass valve 110 according to the temperature of the inflow transmission oil introduced from the transmission 5.

In the various embodiments, the sliding member 121 is formed with at least one relief hole 143 that is formed at a position spaced apart from the mounting part 122 on the other end formed with the mounting part 122.

Such relief holes 143 can be formed at positions spaced apart from each other at a predetermined angle along the circumferential direction around the mounting part 122, and in the various embodiments, four relief holes 143 are formed at positions spaced apart from each other around the mounting part 122 at an angle of 90°.

In the various embodiments, the four relief holes 143 formed at the positions spaced from each other along the circumferential direction around the mounting part 122 at the angle of 90° are described as exemplary embodiments, but the present invention is not limited thereto, and the size, the number, and the positions of the relief holes 143 can be modified and applied.

In the various embodiments, a pressure controller 150 can be provided between the sliding member 121 and the deformable member 137. The pressure controller 150 selectively opens and closes the relief hole 143 to control the internal pressure of the valve housing 111, when differential pressure occurs by the cooled transmission oil having flowed from the oil cooler 9 inside the valve housing 111.

The pressure controller 150 is configured to include an opening and closing member 151 that is disposed inside the other end of the sliding member 121 so to be able to ascend and descend to correspond to the relief hole 143, and a second elastic member 155 that is disposed between the opening and closing member 151 and the deformable member 137 inside the sliding member 121 and that supplies elastic force to the opening and closing member 151.

The opening and closing member 151 is formed in a disk shape with a penetration hole 152 at the center to correspond to the mounting part 122, and can be mounted to the inside of the other end of the sliding member 121 in the state of being inserted into the mounting part 122 through the penetration hole 152.

Furthermore, the opening and closing member 151 can be integrally formed with a protrusion 153 that protrudes toward the second elastic member 155 from the interior circumferential surface of the penetration hole 152.

Such the protrusion 153 guides the opening and closing member 151 so as to stably ascend and descend along the mounting part 122, when the differential pressure occurs depending on the flow rate of the transmission oil having flowed from the oil cooler 9 in the valve housing 110 or the generated differential pressure is released and the opening and closing member 151 ascends or descends.

The second elastic member 155 can be formed by a coil spring, one end of which is supported by the deformable member 137, and the other end of which is supported by the opening and closing member 151.

Hereinafter, the operation of the pressure controller 150 as configured above will be described referring to FIG. 7A and FIG. 7B.

FIG. 7A and FIG. 7B are diagrams of a step-by-step operation state of the pressure controller that is applied to the valve for a vehicle according to various embodiments of the present invention.

Referring to FIG. 7A and FIG. 7B, the pressure controller 150 is selectively operated in a state in which the bypass hole 114 and the discharge hole 115 are open, as the sliding member 121 moves forward (ascends in the drawing) by the expansion deformation of the deformable member 137.

When an amount of the cooled transmission oil having flowed from header tank 101 into the valve housing 111 via the discharge hole 115 is low, the pressure difference is not generated between the upper part and the lower part with respect to the bottom of the sliding member 121 in the valve housing 111.

Accordingly, as in S10 of FIG. 7A, the pressure controller 150 maintains the initial mounting state in which the relief hole 143 is closed.

When an amount of the cooled transmission oil having flowed into the valve housing 111 through the discharge hole 115 is increased, the pressure difference is generated between upper part and lower part with respect to the bottom of the sliding member 121 in the valve housing 111.

As in S20 of FIG. 7B, the opening and closing member 151 ascends by the pressure of the transmission oil due to the generated differential pressure to open the relief holes 143.

Then, a part of the cooled transmission oil having flowed through the discharge hole 115 flows into the sliding member 121 through the open relief hole 143, thereby eliminating the pressure difference inside the valve housing 111 that is located inside the sliding member 121 and below the sliding member 121.

Furthermore, when the differential pressure inside the valve housing 111 is eliminated, the opening and closing member 151 of the pressure controller 150 is rapidly lowered by elastic force of the second elastic member 155 that is compressed during ascent of the opening and closing member 151 and returned to the initial mounting state, thereby again closing the relief holes 143 as in S10 of FIG. 7A.

That is, through the above-described operation, the bypass valve 110 may eliminate the pressure difference caused by the difference in flow rate of the transmission oil flowing into the valve housing 111 from the transmission 5 and the header tank 101, by the operation of the relief hole 143 and the pressure controller 150.

Furthermore, if the valve housing 111 eliminates the pressure difference caused by the difference thereinside, it may be possible to improve the overall pressure resistance and durability of the bypass valve 110 and to improve reliability and responsiveness of the valve operation.

As mentioned above, in accordance with the oil cooler 100 for a vehicle according to various embodiments of the present invention, by having a bypass valve 110 which is operated according to the temperature of the transmission oil, there is an effect of improving spatial utility of an engine compartment.

Furthermore, by controlling the flow stream of the working fluids to allow the working fluids to bypass or flow into the oil cooler 100, while rapidly expanding or contracting depending on the temperature of transmission oil through a bypass valve 110 provided integrally, and the oil cooler 100 in a simple structure, there is an effect of achieving convenient manufacturing and assembling, and reducing manufacturing cost through simplification of the constituent elements.

In addition, there are effects in which, during bypass of the transmission oil, the required power of a hydraulic pump can be reduced through the increase of flow rate, by assembling the internal constituent elements to the valve housing 111 provided integrally with the header tank 101 later, and since the internal components can be replaced after breakdown, the maintenance costs are reduced and the convenience of replacement work is improved.

Further, there are effects in which the flow rate can be increased by securing the bypass flow passage compared to the related art, by preventing the transmission oil cooled by the oil cooler 100 from leaking to the transmission in advance via the bypass valve 110.

Also, reliability of the flow stream control according to temperature of the transmission oil can be secured, and by reducing the friction loss inside the transmission 5 through the rapid warming of the transmission oil, the overall fuel consumption efficiency of the vehicle is improved.

Although the case in which the working fluid is configured of transmission oil introduced from a transmission 5 has been described by way of example in describing the oil cooler 100 for a vehicle according to various embodiments of the present invention, the present invention is not limited thereto. That is, all of working fluids that need to be warmed or cooled through heat exchange may be used as the working fluids.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An oil cooler for a vehicle comprising:
   a header tank partitioned by a diaphragm formed at an inside of a center in a length direction thereof, and adapted to take in a working fluid at a first side and to take out the working fluid at a second side with respect to the diaphragm;
   a connection tank disposed to be spaced apart from the header tank by a predetermined interval;
   a plurality of tubes mounted along a length direction at an interior surface of the header tank to connect with the connection tank such that the working fluid flows therethrough; and
   a bypass valve integrally mounted at an outside of the header tank and connected to the inside of the header tank so as to bypass or flow the working fluid flowing therein into the inflow tank by selectively opening/closing according to a temperature of the working fluid.

2. The oil cooler for a vehicle of claim 1, wherein the header tank and the connection tank are adapted to have the tubes therebetween, and are fixed by a side plate which is mounted to connect insides of both ends of the header tank with insides of both ends of the connection tank in a state of being disposed apart from each other.

3. The oil cooler of claim 1, wherein the working fluid is transmission oil introduced from a transmission.

4. The oil cooler of claim 1, wherein the working fluid is configured such that when the bypass valve is opened, the working fluid flows into the first side of the header tank with respect to the diaphragm, flows into the connection tank through each tube, flows from the connection tank through each tube, and flows into the second side of the header tank with respect to the diaphragm.

5. The oil cooler of claim 1, wherein the working fluid flows in a U-turn flow direction to be discharged from the header tank via the connection tank and then flows into the header tank again, and is cooled by passing through each of the tubes so as to be heat exchanged with outside air.

6. The oil cooler of claim 1, wherein the bypass valve comprises:

a valve housing integrally mounted at the outside of the header tank; and
   a controller mounted at an inside of the valve housing and adapted to flow the working fluid having flowed therein into the inflow tank or to bypass it by performing expansion or contraction according to the temperature of the inflowed working fluid.

7. The oil cooler of claim 6, wherein the valve housing comprises:
   a first inflow hole formed at a first side thereof, which is an opposite side of the header tank, such that an inflow port is mounted thereto;
   a bypass hole formed at a second side thereof which is positioned apart from the first inflow hole such that a bypass port is mounted thereto;
   a second inflow hole formed to correspond with the first inflow hole at one surface which contacts the header tank and communicated with the first side of the inside of the header tank with respect to the diaphragm; and
   a discharge hole formed apart from the second inflow hole so as to be communicated with the second side of the inside of the header tank with respect to the diaphragm.

8. The oil cooler of claim 7, wherein the valve housing forms a mounting space where the first and second inflow holes, the bypass hole, and the discharge hole communicate therewith.

9. The oil cooler of claim 7, wherein the controller comprises:
   a sliding member of which a first end is open and a mounting part is formed at a center of a second end, at least one first opening hole is formed on a first side corresponding to the first inflow hole and the bypass hole along the length direction, and at least one second opening hole is formed on a second side corresponding to the second inflow hole and the discharge hole along the length direction, and which is inserted to be slidable inside the valve housing;
   an end cap adapted to be mounted to a mounting hole which is formed at the valve housing such that the sliding member is inserted into the mounting hole, to close the mounting hole, and to form a fixing groove at the center thereof;
   a fixing rod adapted such that a first end thereof is fixed to the fixing groove;
   a deformable member inserted into the sliding member and adapted to forwardly or backwardly move on the fixing rod by extending or contracting according to a temperature of the working fluid that is changed such that the sliding member is selectively moved; and
   a first elastic member interposed between the valve housing and the sliding member and compressed or pulled so as to provide elastic force while the sliding member moves.

10. The oil cooler of claim 9 wherein the first opening hole and the second opening hole are separately formed at a first side and a second side in the length direction of the sliding member, respectively, and in the first and second opening holes positioned at the first side, a size of the first opening hole is formed to be greater than a size of the second opening hole.

11. The oil cooler of claim 9 wherein the sliding member is configured such that when the deformable member is not deformed, the first opening hole is positioned in the first inflow hole and the bypass hole, and of the second opening holes, the second opening hole positioned at the first side is positioned below the second inflow hole, and the second opening hole positioned at the second side is positioned in the discharge hole.

12. The oil cooler of claim 9, wherein the sliding member is configured such that when the deformable member is deformed, the fixing rod ascends and maintains the bypass hole and the discharge hole in an open state at a time of deformation of the deformable member, and the first and second opening holes positioned at the first side are positioned in the first and second inflow holes to open the first and second inflow holes.

13. The oil cooler of claim 9, wherein the sliding member is fixed to the deformable member through a fixing ring mounted between the mounting part and the deformable member below the deformable member inserted to the mounting part.

14. The oil cooler of claim 9, wherein a seal ring that prevents the working fluid flowing into the valve housing from leaking to an outside of the valve housing is mounted between the valve housing and the end cap.

15. The oil cooler of claim 9, wherein the end cap is fixed to the valve housing through a mounting ring that is fixedly mounted to an interior circumferential surface of mounting hole.

16. The oil cooler of claim 15, wherein the mounting ring is fixedly mounted through a ring groove formed along a periphery of the interior circumferential surface of the mounting hole.

17. The oil cooler of claim 9, wherein the sliding member includes at least one relief hole that is formed at a position spaced apart from the mounting part at the second end in which the mounting part is formed.

18. The oil cooler of claim 17, wherein a plurality of the relief holes is formed at positions spaced apart from each other at a predetermined angle along a circumferential direction around the mounting part.

19. The oil cooler of claim 18, wherein a pressure controller which is configured to selectively open and close the relief hole when a differential pressure occurs by the working fluid having flowed inside the valve housing is provided between the sliding member and the deformable member.

20. The oil cooler of claim 19, wherein the pressure controller comprises:
   an opening and closing member disposed inside the second end of the sliding member to correspond to the relief hole; and
   a second elastic member interposed between the opening and closing member and the deformable member inside the sliding member, and configured to apply elastic force to the opening and closing member.

21. The oil cooler of claim 20, wherein the opening and closing member is formed in a disk shape having a penetration hole formed at a center thereof to correspond to the mounting part.

22. The oil cooler of claim 21, wherein the opening and closing member is
   integrally formed with a protrusion that protrudes toward the second elastic member from an interior circumferential surface of the penetration hole.

* * * * *